Nov. 30, 1937.  R. H. KAUFMANN  2,100,854
GENERATOR REGULATION
Filed Aug. 27, 1935
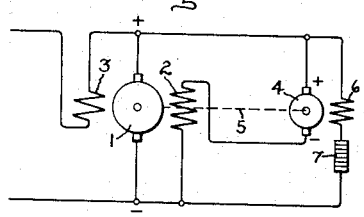
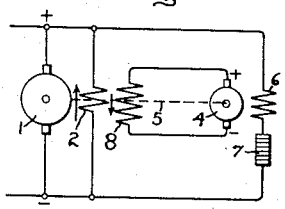
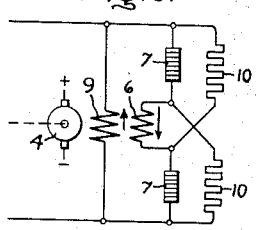
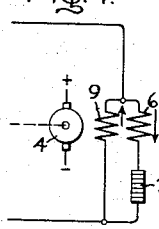
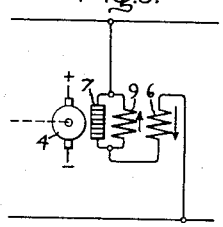
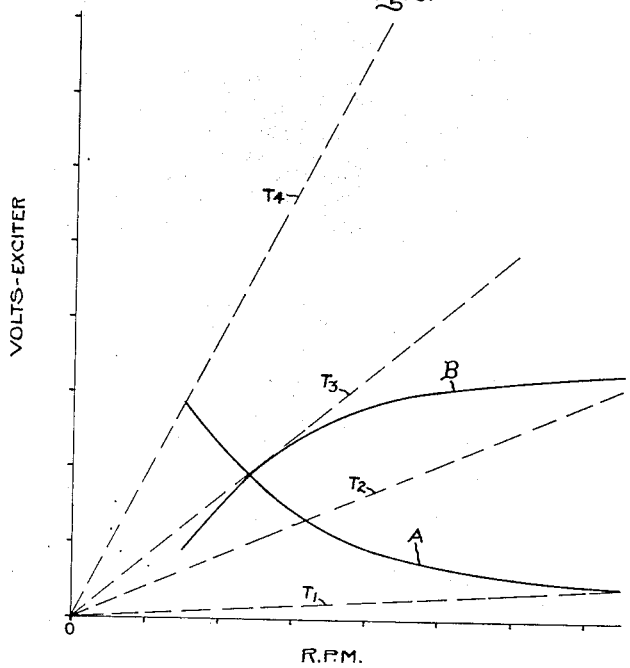
Inventor:
Richard H. Kaufmann,
by Harry E. Dunham
His Attorney.

Patented Nov. 30, 1937

2,100,854

UNITED STATES PATENT OFFICE 2,100,854

GENERATOR REGULATION

Richard H. Kaufmann, Schenectady, N. Y., assignor to General Electric Company, a corporation of New York Application August 27, 1935, Serial No. 38,041

3 Claims. (Cl. 171—229)

My invention relates to generator regulation and more particularly to automatic means for maintaining substantially constant voltage output of variable speed driven dynamo-electric generators.

Most electrically operated devices such as lamps, motors and appliances operate best and most efficiently at the particular voltage for which they are rated. The voltage of most electric generators and particularly direct-current generators, ordinarily varies abruptly in proportion to the speed at which they are driven and as there are many prime movers for generators, such as internal combustion engines, car axles, water wheels, wind mills, etc., whose speed is relatively widely variable it is clear that in such instances it is necessary to provide voltage regulating means in order to secure best operation of the load devices operated by the generator.

In accordance with my invention I provide a novel and simple arrangement for securing substantially constant voltage output of variable speed driven dynamo-electric generators by means of rugged vibration-proof means making use of the minimum number of moving parts. I secure this result by means of an auxiliary generator driven at a speed proportional to the speed of the main generator whose voltage is to be maintained constant and I control the excitation of the auxiliary generator in response to the voltage of the main generator by means of a non-linear impedance. Such a circuit has a number of advantages which will be pointed out more in detail hereinafter.

An object of my invention is to provide a novel and simple generator regulating system.

Another object of my invention is to provide a rugged and inexpensive voltage control system for variable speed driven generators, which employs a minimum number of moving parts.

A further object of my invention is to provide a rugged, inexpensive, simple and efficient voltage control circuit for variable speed-driven direct-current generators.

My invention will be better understood from the following description taken in connection with the accompanying drawing and its scope will be pointed out in the appended claims.

In the drawing Fig. 1 is a diagrammatic showing of an embodiment of my invention making use of opposed E. M. F.'s for securing the necessary regulation, Fig. 2 is a modification whereby opposed M. M. F.'s are employed in place of opposed E. M. F.'s, Fig. 3 is a modified form of excitation control for the auxiliary generator which may be applied either to the circuit of Fig. 1 or to the circuit of Fig. 2, Fig. 4 is a modification of Fig. 3, Fig. 5 is a further modification of Fig. 3 and Fig. 6 is a set of curves for illustrating the operation and advantages of my invention.

Referring now to the drawing and more particularly to Fig. 1, I have shown therein a main generator 1 which is adapted to be driven by any suitable variable speed prime mover (not shown). Generator 1 is shown as a direct-current machine although as far as the principles of my invention are concerned it could also be an alternating-current machine provided suitable rectifiers were employed for securing the necessary excitation. Generator 1 is provided with a shunt field winding 2 and if desired a series winding 3 may be used to compensate for the effect of load changes. Arranged to be driven at a speed proportional to the speed of main generator 1 is an auxiliary direct-current generator 4 which, as shown, is direct connected to the main generator by means of a shaft 5. It is connected in series opposition with the shunt field winding 2 of main generator 1. This is indicated by the polarity symbols for the main generator and the auxiliary generator, respectively. Auxiliary generator 4 is provided with a field winding 6 which is connected to be responsive to the voltage of the main generator 1 and as shown is connected across this generator. In circuit with field winding 6 is a non-linear resistor 7. This resistor has the property of reducing its resistance with increases in current therethrough or voltage applied thereto or, in other words, it has a negative current-resistance characteristic. A preferred form of such resistor is the ceramic resistance material disclosed and claimed in McEachron Patent 1,822,742, granted September 8, 1932 and assigned to the assignee of the present application. That material has the trade name "Thyrite".

The operation of the embodiment of my invention illustrated in Fig. 1 is as follows: If, due to an increase in speed, the voltage of main generator 1 increases, the current through field winding 6 of the auxiliary generator 4 will also increase. This increase in excitation of the auxiliary generator 4 combined with the increase in speed will produce a relatively large increase in voltage thereof and as the voltage of the auxiliary generator 4 opposes the voltages of the main generator with respect to the field winding 2 the action will be to prevent an increase in current in the field winding 2 which is proportional to the increased voltage. It can even be made to reduce the excitation produced by the winding 2 so as to tend to cancel the effect of the increased speed of generator 1 on the voltage of the generator 1.

The non-linear resistor 7 causes a disproportionately large change in current in the field winding 6 with changes in voltage, so as to make the circuit very sensitive and provide substantially complete cancelation of the effect of changes in speed on the voltage of generator 1. If the resistor 7 is of the type whose resistance changes with temperature the action will be relatively slow. If, however, the resistor 7 is made of a material having a negative current-resistance characteristic without appreciable temperature dependence such as "Thyrite" the action will be substantially instantaneous and will follow the exponential law $RI^a=C$ wherein R is the resistance, I is the current, $a$ is the exponent and C is a constant. By suitably choosing the exponent $a$ and the constant C the regulating circuit may be made extremely sensitive to very small changes in voltage of the main generator 1 so that over a relatively wide speed range, such for example, 3, 4, or 5 to 1, the voltage of the generator is held within plus or minus 2 per cent or 3 per cent of normal.

In Fig. 2 regulation is secured by opposed M. M. F.'s instead of by opposed E. M. F.'s as in Fig. 1. This is secured by means of an auxiliary opposing field winding 8 for the main generator 1 which field winding is connected across the terminals of auxiliary generator 4. In this circuit the shunt winding 2 of main generator 1 is connected directly across on the main generator 1 and does not have the armature of the auxiliary generator in circuit therewith as in Fig. 1.

In the operation of the arrangement illustrated in Fig. 2, an increase in speed of the main generator 1 which causes an increase in voltage will in turn cause such an increase in the voltage of auxiliary generator 4 that the opposing action of auxiliary field winding 8 more than counterbalances the increase in excitation of the field winding 2, due to the increase in voltage, so that there is a resultant decrease in excitation of the generator 1 sufficient to offset its increase in speed. Consequently only a very slight change in voltage is permitted. With a decrease in voltage, corresponding to a decrease in speed, the action is reversed.

In the modification shown in Fig. 3 the auxiliary generator 4 is provided with an additional field winding 9 connected directly across the main generator 1 and arranged so as to oppose the field winding 6. In addition the field winding 6 is connected across the main generator 1 through a non-linear bridge circuit two of whose arms are composed of "Thyrite" elements 7, the other two arms being composed of conventional resistors 10 whose resistance values are independent of current.

With the arrangement illustrated in Fig. 3 an extremely sensitive and accurate regulation is obtainable as the bridge circuit can be made very critical and sensitive to changes in voltage, while the action of the opposed field windings 6 and 9 results in an improved characteristic of voltage versus speed for the generator 4. The circuit shown in Fig. 3 may be used with either the circuit of Fig. 1 or the circuit of Fig. 2, that is to say with either opposed E. M. F.'s or opposed M. M. F.'s.

The operation of this arrangement may be understood more clearly from the following description. Not only are field windings 6 and 9 in opposition to each other but as indicated on the drawing by the relative lengths of the arrows associated with each of these windings the normal strength of winding 6 is greater than that of winding 9. Consequently, the net ampere turns for exciting the auxiliary machine 4 are less than the ampere turns of the winding 6. If now a given percentage change in voltage of the main generator 1 occurs the change in ampere turns of the winding 9 will be the same percentage but the change in ampere turns of the winding 6 will be a much greater percentage by reason of the fact that it is energized through the non-linear bridge circuit. Consequently the change in net ampere turns will be due primarily to the change in ampere turns of the winding 6 and as the net ampere turns are less than the ampere turns of the winding 6 the percentage change in net ampere turns will ordinarily be greater than the percentage change in ampere turns of the winding 6. It will thus be seen that both the non-linear bridge circuit and the differential or opposed relation of the windings 6 and 7 contribute to produce an increased sensitivity of control.

In Fig. 4 the non-linear bridge is replaced by a simple non-linear resistance element 7 while in Fig. 5 the windings 6 and 9 are connected in series instead of in parallel and the non-linear resistor 7 is connected in parallel with the field winding 9. With the circuit of Fig. 5 an increased voltage causes the non-linear element to perform the double function of increasing the current through the field winding 6 and at the same time reducing the proportion of the total current passing through the field winding 9.

In Fig. 6 the curve A represents the change in voltage which must be applied to the field winding 2 of Fig. 1 over a given range of speed in order to maintain constant generator voltage. Curve B is a curve of the change in voltage of the auxiliary generator 4 which is necessary to produce this change in the main field voltage. It will be seen that this latter voltage is relatively low at low speeds and increases as the speed increases. For this reason a smaller and less expensive auxiliary generator can be employed than would be the case if the field winding 2 were excited directly by the auxiliary machine and independently of the voltage of the main generator. In other words, if the winding 2 were separately excited from the auxiliary generator 4 the change in voltage of the auxiliary machine would have to correspond to the curve A. As this curve shows, the maximum voltage occurs at the minimum speed so that a relatively large and expensive auxiliary generator would be required for such a connection. Furthermore, the dashed lines $T_1$ and $T_4$ represent the range of minimum to maximum voltage of a shunt exciter whereas the dashed lines $T_2$ and $T_3$ indicate the range of voltage for the circuit shown in Fig. 1. As will be seen, the angle between $T_2$ and $T_3$ is much less than the angle between $T_1$ and $T_4$ thus indicating that the necessary range of control is much less for the case where the auxiliary machine acts as an opposing or series machine rather than as a separately exciting machine.

While I have shown and described particular embodiments of my invention, it will be obvious to those skilled in the art that changes and modifications may be made without departing from my invention, and I, therefore, aim in the appended claims to cover all such changes and modifications as fall within the true spirit and scope of my invention.

What I claim as new and desire to secure by Letters Patent of the United States, is:

1. In combination, a variable speed driven main generator having a shunt-connected field winding the current in which is substantially affected by normal changes in voltage of said generator, an auxiliary direct current generator arranged to be driven directly from said main generator and having its armature connected in series opposition with the shunt field winding of said main generator, a field winding for said auxiliary generator connected to be energized from across the circuit of said main generator, and a two-terminal resistance element the resistance of which between said two terminals decreases substantially with increases in voltage applied between said two terminals connected in series with the field winding of said auxiliary generator so as to cause a percentage current change therein which is sufficiently greater than a percentage voltage change producing it to cause the voltage of said main generator to be substantially independent of its speed over a relatively wide range in normal operation.

2. In combination, a variable speed driven main generator having a shunt connected field winding, means including a direct driven auxiliary direct current generator connected to oppose the excitation produced by said shunt field winding, a field winding for said auxiliary generator, and a non-linear bridge circuit having input terminals connected across said main generator and having output terminals between different parallel pairs of arms of said bridge between which the field winding of said auxiliary generator is connected.

3. In combination, a variable speed driven main generator having a shunt connected field winding, a direct driven auxiliary direct current generator connected in series opposition with said shunt field winding, a field winding for said auxiliary generator connected to be energized from across the circuit of said main generator, a second field winding on said auxiliary generator, and a bridge circuit for energizing said second field winding from across said main generator so that it opposes the first field winding on said auxiliary generator, at least one of the arms of said bridge circuit being composed of an instantaneously acting negative resistance current characteristic resistor.

RICHARD H. KAUFMANN.